United States Patent [19]
Shields et al.

[11] Patent Number: 5,910,800
[45] Date of Patent: Jun. 8, 1999

[54] USAGE TIPS FOR ON-SCREEN TOUCH-SENSITIVE CONTROLS

[75] Inventors: Kevin Timothy Shields, Redmond; Jossef Goldberg, Seattle, both of Wash.

[73] Assignee: Microsoft Corporation, Redmond, Wash.

[21] Appl. No.: 08/873,056

[22] Filed: Jun. 11, 1997

[51] Int. Cl.$^6$ ........................................................ G06F 3/00
[52] U.S. Cl. ............................................ 345/336; 345/173
[58] Field of Search ...................... 345/336, 337, 345/338, 173–183; 379/93.19

[56] References Cited

U.S. PATENT DOCUMENTS 5,448,695  9/1995  Douglas et al. ........................ 345/347

*Primary Examiner*—A. Katbab
*Attorney, Agent, or Firm*—Lee & Hayes, PLLC

[57] ABSTRACT

A portable handheld computing device has a processor and a touch-sensitive display. The display includes a touch-sensitive area superimposed on a viewing area. The handheld computing device has an operating system which executes on the processor to provide a graphical user interface environment capable of presenting a plurality of on-screen controls that can be activated by tapping on them with a stylus. The operating system is configured to present a usage tip relating to a particular on-screen control when a user touches the display over the control for a predefined duration.

19 Claims, 2 Drawing Sheets

5,910,800

USAGE TIPS FOR ON-SCREEN TOUCH-SENSITIVE CONTROLS

TECHNICAL FIELD

This invention relates to computers and computer-like devices that use stylus- or touch-activated controls on touch-sensitive displays.

BACKGROUND OF THE INVENTION

Small, handheld computing devices have been steadily growing in popularity in recent years. The devices go by different names, including palmtops, pocket computers, personal digital assistants, personal organizers, and the like. In this disclosure, this class of computing devices is generally referred to as "handheld personal computers", "handheld PCs", or "H/PCs".

H/PCs are small, pocket-sized devices having an LCD (liquid crystal display) with a touch-sensitive screen, a stylus to enter data through the screen, and an input device such as a keypad or miniature QWERTY keyboard. H/PCs have a microprocessor, memory, and are capable of running an operating system and one or more applications on the operating system. Microsoft Corporation recently released the Windows® CE operating system for use on H/PCs, which is a scaled-down version of its popular Windows® operating systems manufactured for personal computers.

In the past, the Windows® family of operating systems has made extensive use of an on-screen pointer that moves in response to mouse movement. The Windows® CE operating system, on the other hand, is designed to work with small computers that do not use a mouse. Instead of a mouse, these computers use a stylus in conjunction with a touch-sensitive display.

In designing the Windows® CE user interface, it was desired to maintain the look and feel of the original Windows® products as much as possible. Thus, an attempt was made to simulate mouse actions with the stylus. Thus, touching an on-screen control with the stylus is equivalent to single-clicking a mouse when the pointer has been positioned over an on-screen control. Double-tapping a control with the stylus is equivalent to double-clicking with a mouse.

Some functions and user interface characteristics, however, are difficult to achieve with a stylus. Control usage tips, referred to within the Windows® operating systems as "ToolTips," are an example of a feature that could not be implemented with a stylus-based system as it had been in previous mouse-based systems. In a mouse-based system, the displayed on-screen pointer was moved over a control and the control was then selected by clicking the left mouse button. If the pointer was allowed to remain stationary over a control without clicking, a small, temporary, pop-up window appeared containing a tip about the control. This tip might have been a single word or a short phrase indicating the function of the control. For example, a usage tip for a "print" button might have been simply the word "print".

In a stylus-based system, there is no apparent equivalent for the process of moving a mouse pointer over an on-screen control and leaving it there for a ToolTip to appear—there is no mouse pointer in a stylus-based system. However, the inventors have developed a way to incorporate ToolTips in the Windows® CE environment in a way that becomes very intuitive after only brief usage.

SUMMARY OF THE INVENTION

The invention is embodied in an operating system designed to execute on small, "sub-desktop" computers such as handheld computers and other devices that utilize a graphical user interface. Such a user interface uses on-screen controls that can be selected or activated by touching or tapping the display over the controls. In accordance with the invention, an on-screen usage tip is presented whenever a user touches the display over a control and continues touching the control for a predefined duration. If the user then stops touching the control, the control is selected or activated. If the user moves or slides away from the control before he or she stops touching the display, the control is not activated.

In the preferred embodiment of the invention, the usage tip is presented in a pop-up text box near the on-screen control.

BRIEF DESCRIPTION OF THE DRAWINGS

The same reference numbers are used throughout the drawings to reference like components and features.

DETAILED DESCRIPTION OF THE PREFERRED EMBODIMENT

Figure 1:
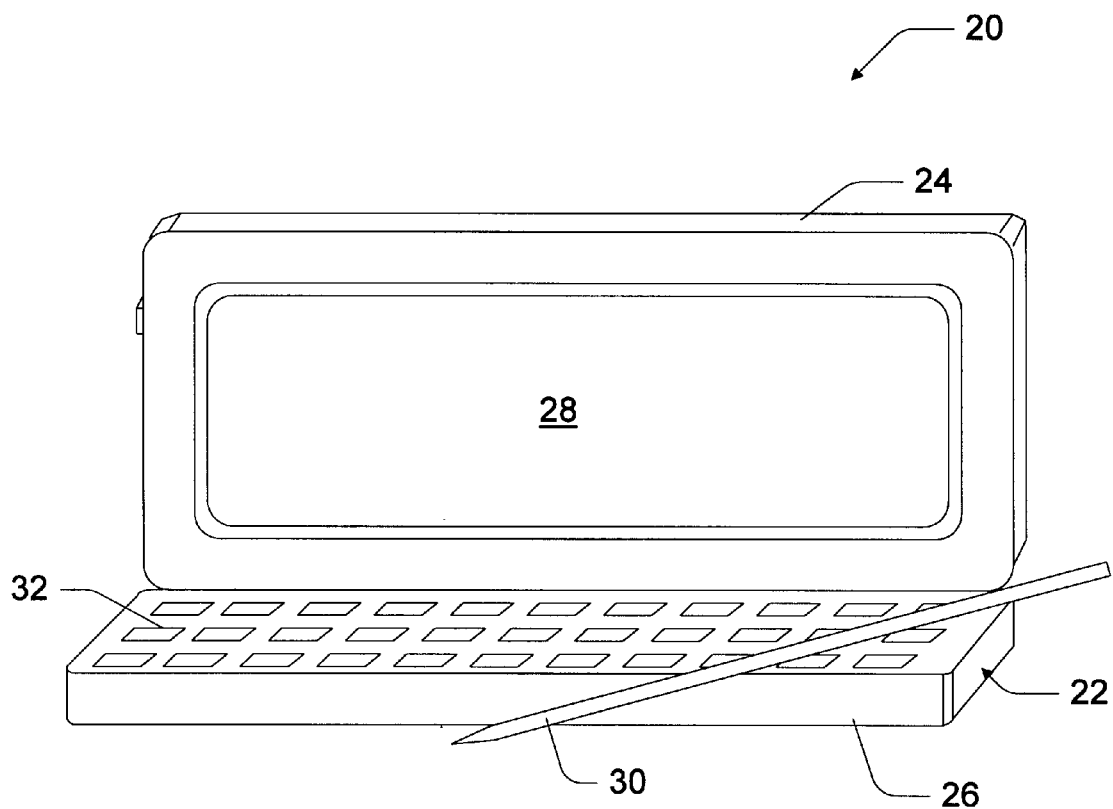
FIG. 1 is a perspective view of a handheld computing device in an open position.

FIG. 1 shows a handheld computing device 20. As used herein, "handheld computing device" means a small computing device having a processing unit that is capable of running one or more application programs, a display, and an input mechanism such as a keypad, a touch-sensitive screen, a track ball, a touch-sensitive pad, a miniaturized QWERTY keyboard, or the like.

The handheld computing device 20 is embodied as a handheld personal computer. The terms "handheld computing device" and "handheld personal computer" (or handheld PC or H/PC) are used interchangeably throughout this disclosure. However, in other implementations, the handheld computing device may be implemented as a personal digital assistant (PDA), a personal organizer, a palmtop computer, a computerized notepad, or the like. The invention can also be implemented in other types of computers and computer-like or computer-controlled devices.

Handheld computing device 20 has a casing 22 with a cover or lid 24 and a base 26. The handheld computing device 20 has a liquid crystal display (LCD) 28 with a touch-sensitive screen mounted to the lid 24. The lid 24 is hinged to base 26 to pivot between an open position, which exposes display 28, and a closed position, which protects the display. The device is equipped with a stylus 30 to enter data through touchscreen display 28 and a miniature QWERTY keyboard 32. The stylus 30 and keyboard 32 are both mounted in base 26.

The handheld computing device 20 can also be implemented with a wireless transceiver (not shown) such as an IR (infrared) transceiver and/or an RF (radio frequency) transceiver. Although the illustrated implementation shows a two-member H/PC 20 with a lid 24 and a base 26, other implementations of the H/PC might comprise an integrated body without hinged components, as is the case with computerized notepads (e.g., Newton® from Apple Computers).

Figure 2:
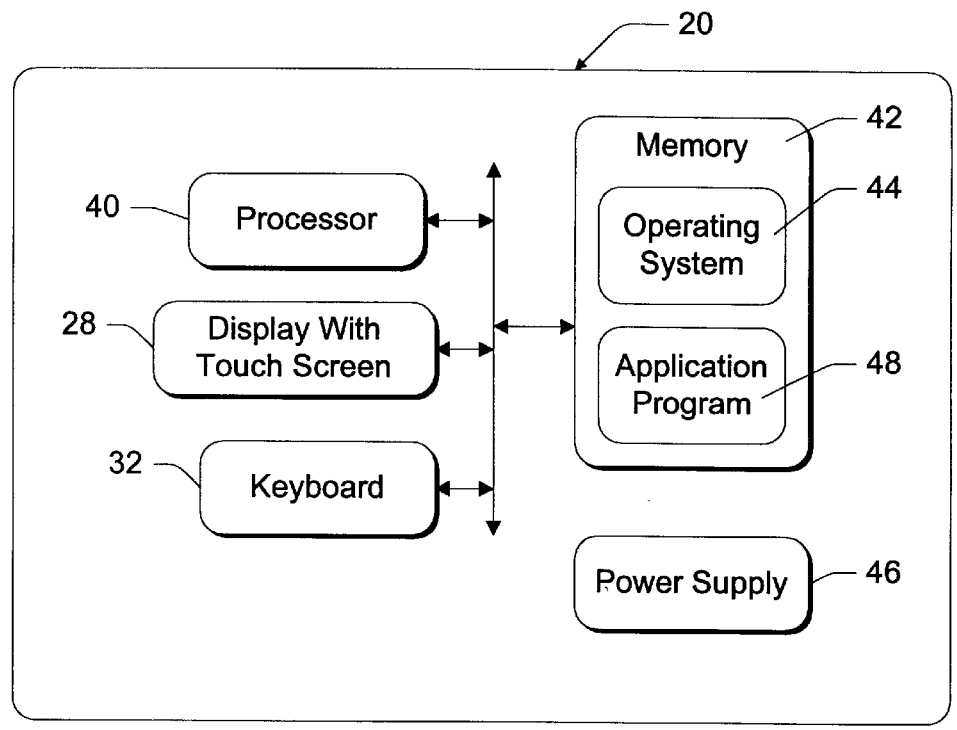
FIG. 2 is a block diagram of the handheld computing device.

FIG. 2 shows functional components of the handheld computing device 20. It has a processor 40, a computer-readable storage medium or memory 42, a display 28, and a keyboard 32. Memory 42 generally includes both volatile memory (e.g., RAM) and non-volatile memory (e.g., ROM, PCMCIA cards, etc.). The H/PC 20 has a power supply 46 that supplies power to the electronic components. The power supply 46 is preferably implemented as one or more batteries. The power supply 46 might further represent an external power source that overrides or recharges the built-in batteries, such as an AC adapter or a powered docking cradle.

An operating system program 44 is resident in the memory 42 and executes on the processor 40. The operating system 44 is a multitasking operating system that allows simultaneous execution of multiple applications. The operating system employs a graphical user interface windowing environment that presents applications and documents in specially delineated areas of the display screen called "windows." Each window can act independently, including its own menu, toolbar, pointers, and other controls, as if it were a virtual display device. It is noted, however, that the handheld computing device may be implemented with other types of operating systems that support a graphical user interface.

The operating system 44 is preferably the Windows® CE operating system from Microsoft Corporation that is configured to implement control usage tips or ToolTips in conjunction with application programs such as application program 48 shown in FIG. 2. The Windows® CE operating system is a derivative of Windows® brand operating systems, such as Windows® 95, that is especially designed for handheld computing devices.

Figure 3:
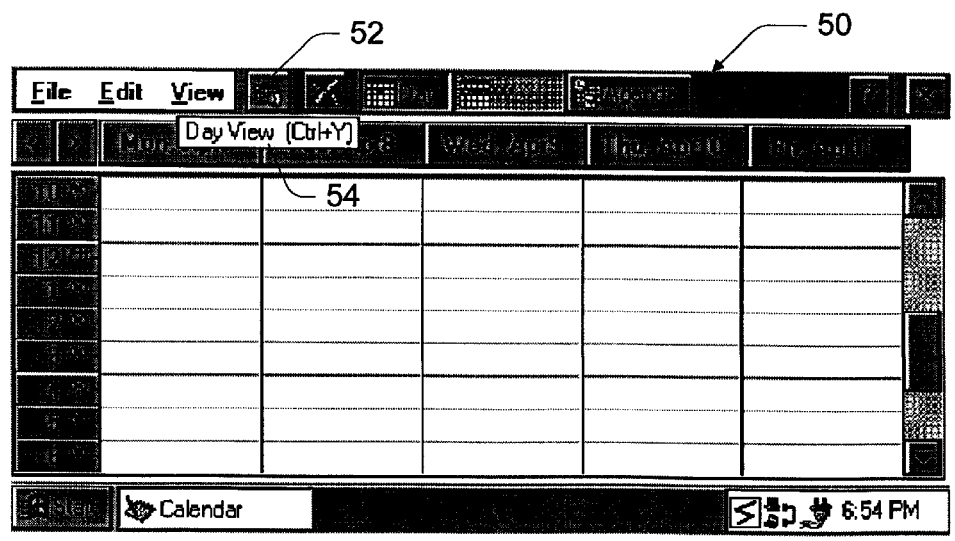
FIG. 3 is a diagrammatic illustration of a touch-sensitive display utilized in the handheld computing device.

FIG. 3 shows an example of a graphical display 50 generated by application program 48 in conjunction with operating system 44. The display includes a number of elements that are generated by making appropriate system calls to the operating system in accordance with well-known protocols. Specifically, Window® CE supports a subset of the Win32 API set used in the Windows® 95 operating system. These APIs allow an application program to create a variety of on-screen controls with minimal effort. Some of these controls are for display only, while others can be selected or activated by touching the display screen over such controls. When a control is selected, a message is sent from the operating system to the application program that created the control, and the application program generally takes some action in response to activation of the control.

Due to limited screen space and the use of a stylus and touch screen to enter data, handheld PCs such as the one described herein do not support a mouse pointer. Rather, stylus 30 is used in conjunction with touch-sensitive display 28 for selecting or activating controls. To select a particular control, a user touches or taps display 28 over the control. The "double-clicking" of previous versions of Windows® is accomplished in Windows® CE by "double-tapping" over a control with the stylus. The particular mechanism of selecting a control is transparent to the application program, since the operating system takes care of these details.

The graphical element labeled 52 in FIG. 3 is an example of an on-screen control that can be activated by tapping. This control is referred to as a "button" control, and is part of a "toolbar." Pressing or tapping the button with the stylus causes the application program to change the display view from the "week view" currently shown to a "day view," in which appointments for only a single day are shown in detail.

Even though the Windows® CE operating system strives to emulate Windows® 95 wherever possible, the previous technique for activating control usage tips cannot be carried over from Windows® 95. This is because there is no on-screen mouse pointer that can be positioned and left over a control.

In the present embodiment of the invention, the operating system is configured to present a usage tip relating to a particular on-screen control whenever a user touches the display over said control for a predefined duration. In FIG. 3, for example, the user has pressed the display over button 52 and has held the stylus against the button for a predefined duration of about 0.4 seconds. In response, the operating system has displayed a pop-up box 54 near button 52. The box contains a usage tip in the form of text which reads "Day View (Ctrl+Y)"—indicating (in this example) the function of the button and a shortcut key to accomplish the same function. Generally, an application program can specify any arbitrary text for the usage tip. Tips are specified by the application program just as they are in previous versions of the Windows® operating system.

The operating system discontinues the usage tip when the user stops touching or pressing the display over the control. In addition, the operating system activates the on-screen control if the user stops touching the display without moving away from the on-screen control. If the user moves the stylus away from the control while still pressing on the display, and then stops touching the display after moving away from the control, the control is not activated. In this case, the usage tip is discontinued (removed from the display) when the stylus moves away from the on-screen control.

As illustrated, the invention works best for right-handed users, since the usage tip appears to the left of the selected control. A configuration option can be provided so that usage tips appear to the right of selected controls, for left-handed users.

The invention has been described primarily in terms of its visual and functional characteristics. However, the invention also includes a method of operating an information processing device such as an H/PC that has a touch-sensitive display and associated stylus. The method is implemented by instructions within operating system 44, which are executable to perform steps including a step of presenting a graphical user interface environment including one or more on-screen controls that can be activated by touching the display over said controls. A further step in accordance with the invention comprises presenting a usage tip relating to a particular on-screen control when a user touches the display over said control for a predefined duration. The invention also includes discontinuing the usage tip when the user stops touching the display over said control, and activating the on-screen control if the user stops touching the display without moving away from the control. The control is not activated if the user moves the stylus away from the on-screen control stops before lifting it.

The invention overcomes the limitations of using a stylus in conjunction with a touch-sensitive screen, and provides a way to activate usage tips that quickly becomes intuitive after only limited use.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. For an information processing device having a touch-sensitive display, an operating system embodied on a computer-readable medium to provide a graphical user interface environment having one or more controls that can be activated by touching the display over said controls, wherein the operating system is configured to present a usage tip relating to a particular on-screen control when a user touches the display over said control for a predefined duration; and wherein the operating system activates the on-screen control if the user stops touching the display without moving away from the on-screen control.

2. An operating system as recited in claim 1, wherein the operating system discontinues the usage tip when the user stops touching the display over said control.

3. An operating system as recited in claim 1, wherein the operating system presents the usage tip by displaying text near the on-screen control.

4. An operating system as recited in claim 1, wherein the operating system presents the usage tip by displaying a pop-up text box near the on-screen control.

5. An operating system as recited in claim 1, wherein the operating system does not activate the on-screen control if the user stops touching the display only after moving away from the on-screen control.

6. An operating system as recited in claim 1, wherein the predefined duration is greater than approximately 0.4 seconds.

7. An information processing device comprising:
   a processor;
   a touch-sensitive display having a touch-sensitive area superimposed on a viewing area;
   a program executing on the processor to provide a graphical user interface environment including one or more controls that can be activated by touching the display over said controls;
   wherein the program is configured to present a usage tip relating to a particular on-screen control when a user touches the display over said control for a predefined duration; and
   wherein the program activates the on-screen control if the user stops touching the display without moving away from the on-screen control.

8. An information processing device as recited in claim 7, wherein the program discontinues the usage tip when the user stops touching the display over said control.

9. An information processing device as recited in claim 7, wherein the program presents the usage tip by displaying text near the on-screen control.

10. An information processing device as recited in claim 7, wherein the program presents the usage tip by displaying a pop-up text box near the on-screen control.

11. An information processing device as recited in claim 7, wherein the program does not activate the on-screen control if the user stops touching the display only after moving away from the on-screen control.

12. An information processing device as recited in claim 7, wherein the predefined duration is greater than approximately 0.4 seconds.

13. A method for operating an information processing device having a touch-sensitive display, comprising the following steps:
   presenting a graphical user interface environment including one or more controls that can be activated by touching the display over said controls;
   presenting a usage tip relating to a particular on-screen control when a user touches the display over said control for a predefined duration; and
   activating the on-screen control if the user stops touching the display without moving away from the on-screen control.

14. A method as recited in claim 13, further comprising a step of discontinuing the usage tip when the user stops touching the display over said control.

15. A method as recited in claim 13, wherein the presenting step comprises displaying text near the on-screen control.

16. A method as recited in claim 13, wherein the presenting step comprises displaying a pop-up text box near the on-screen control.

17. A method as recited in claim 13, further comprising a step of not activating the on-screen control if the user stops touching the display only after moving away from the on-screen control.

18. A method as recited in claim 13, wherein the predefined duration is greater than approximately 0.4 seconds.

19. A computer-readable storage medium containing instructions that are executable for performing the steps recited in claim 13.

* * * * *